US006811908B2

(12) United States Patent
Edlund et al.

(10) Patent No.: US 6,811,908 B2
(45) Date of Patent: Nov. 2, 2004

(54) SYSTEM AND METHOD FOR CONTROLLING THE OPERATION OF A FUEL PROCESSING SYSTEM

(75) Inventors: David J. Edlund, Bend, OR (US); Thomas G. Herron, Bend, OR (US); William A. Pledger, Sisters, OR (US)

(73) Assignee: IdaTech, LLC, Bend, OR (US)

( * ) Notice: Subject to any disclaimer, the term of this patent is extended or adjusted under 35 U.S.C. 154(b) by 244 days.

(21) Appl. No.: 10/138,004

(22) Filed: May 3, 2002

(65) Prior Publication Data

US 2002/0127447 A1 Sep. 12, 2002

Related U.S. Application Data

(63) Continuation of application No. 09/414,049, filed on Oct. 6, 1999, now Pat. No. 6,383,670.

(51) Int. Cl.[7] .............................. H01M 8/04; H01M 8/06
(52) U.S. Cl. .............................. 429/19; 429/20; 429/24; 429/25
(58) Field of Search .............................. 429/17, 19, 20, 429/22, 23, 24, 25; 422/108

(56) References Cited

U.S. PATENT DOCUMENTS

| 3,469,944 A | 9/1969 | Bocard et al. |
| 3,765,946 A | 10/1973 | Werner et al. |
| 3,857,735 A | 12/1974 | Louis et al. |
| 3,920,416 A | 11/1975 | Houseman |
| 3,955,941 A | 5/1976 | Houseman et al. |
| 3,982,910 A | 9/1976 | Houseman et al. |
| 4,000,003 A | 12/1976 | Baker et al. |
| 4,003,343 A | 1/1977 | Lee |
| 4,098,959 A | 7/1978 | Fanciullo |
| 4,098,960 A | 7/1978 | Gagnon |
| 4,349,613 A | 9/1982 | Winsel .................. 429/17 |

(List continued on next page.)

FOREIGN PATENT DOCUMENTS

| EP | 0 827 226 A2 | 3/1998 | ............ H01M/8/04 |
| EP | 0 957 063 A1 | 11/1999 | ............ C01B/3/34 |
| EP | 1065741 A2 | 1/2001 | |
| JP | 4-163860 | 6/1992 | |
| WO | WO 99/65097 | 12/1999 | |
| WO | WO 00/02282 | 1/2000 | |

OTHER PUBLICATIONS

English language abstract of Japanese Patent No. 6176779, 1994, Jun.
English language abstract of Japanese Patent No. 7057758, 1995, Mar.
English-language abstract of Japanese Patent No. JP 63-236269, 1999.
English-language abstract of Japanese Patent No. JP 2-168803, 1999.
Nadal, et al., "Development of a Hybrid Fuel Cell/Battery Powered Electric Vehicle," *International Journal of Hydrogen Energy*, vol. 21, No. 6, pp. 497–505, Jun. 1, 1996.

*Primary Examiner*—Stephen J. Kalafut
(74) *Attorney, Agent, or Firm*—Kolisch Hartwell, P.C.

(57) ABSTRACT

A control system and method for a fuel processing system. The control system automates the operation of a fuel processing system by monitoring operating parameters and automatically controlling the operation of the system responsive to the monitored parameters, predefined subroutines and/or user inputs.

42 Claims, 5 Drawing Sheets

U.S. PATENT DOCUMENTS

| | | |
|---|---|---|
| 4,387,434 A | 6/1983 | Moncrief, Jr. et al. |
| 4,444,158 A | 4/1984 | Yoon |
| 4,473,622 A | 9/1984 | Chludzinski et al. |
| 4,533,607 A | 8/1985 | Sederquist |
| 4,567,857 A | 2/1986 | Houseman et al. |
| 4,642,273 A | 2/1987 | Sasaki |
| 4,657,828 A | 4/1987 | Tajima |
| 4,781,241 A | 11/1988 | Misage et al. |
| 4,788,004 A | 11/1988 | Pinto et al. |
| 4,820,594 A | 4/1989 | Sugita et al. |
| 4,839,574 A | 6/1989 | Takabayashi |
| 4,883,724 A | 11/1989 | Yamamoto |
| 4,904,548 A | 2/1990 | Tajima ............... 429/22 |
| 5,006,846 A | 4/1991 | Granville et al. |
| 5,030,661 A | 7/1991 | Lywood |
| 5,139,894 A | 8/1992 | Mizuno et al. |
| 5,154,986 A | 10/1992 | Takechi et al. |
| 5,229,222 A | 7/1993 | Tsutsumi et al. ............ 429/19 |
| 5,334,463 A | 8/1994 | Tajima et al. |
| 5,366,818 A | 11/1994 | Wilkinson et al. |
| 5,366,821 A | 11/1994 | Merritt et al. |
| 5,401,589 A | 3/1995 | Palmer et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,462,815 A | 10/1995 | Horiuchi |
| 5,509,942 A | 4/1996 | Dodge |
| 5,527,632 A | 6/1996 | Gardner ............... 429/17 X |
| 5,624,768 A | 4/1997 | Tanokura |
| 5,631,532 A | 5/1997 | Azuma et al. |
| 5,631,820 A | 5/1997 | Donnelly et al. |
| 5,637,414 A | 6/1997 | Inoue et al. |
| 5,658,681 A | 8/1997 | Sato et al. |
| 5,677,073 A | 10/1997 | Kawatsu ............... 429/22 |
| 5,712,052 A | 1/1998 | Kawatsu ............... 429/17 X |
| 5,714,276 A | 2/1998 | Okamoto |
| 5,763,113 A | 6/1998 | Meltser et al. |
| 5,771,476 A | 6/1998 | Mufford et al. |
| 5,780,179 A | 7/1998 | Okamoto |
| 5,795,666 A | 8/1998 | Johnssen |
| 5,798,186 A | 8/1998 | Fletcher et al. |
| 5,821,185 A | 10/1998 | White et al. |
| 5,861,137 A | 1/1999 | Edlund |
| 5,897,766 A | 4/1999 | Kawatsu |
| 5,897,970 A | 4/1999 | Isomura et al. |
| 5,927,416 A | 7/1999 | del Re et al. |
| 5,929,538 A | 7/1999 | O'Sullivan et al. |
| 5,964,309 A | 10/1999 | Kimura et al. |
| 5,985,474 A | 11/1999 | Chen et al. ............... 429/17 |
| 5,989,739 A | 11/1999 | Zur Megede et al. |
| 5,991,670 A | 11/1999 | Mufford et al. |
| 5,997,594 A | 12/1999 | Edlund et al. |
| 5,998,053 A | 12/1999 | Diethelm |
| 6,001,499 A | 12/1999 | Grot et al. ............... 429/22 |
| 6,013,385 A | 1/2000 | DuBose |
| 6,022,634 A | 2/2000 | Ramunni et al. |
| 6,042,956 A | 3/2000 | Lenel |
| 6,045,772 A | 4/2000 | Szydlowski et al. |
| 6,045,933 A | 4/2000 | Okamoto |
| 6,051,192 A * | 4/2000 | Maston et al. ............ 422/22 X |
| 6,054,229 A | 4/2000 | Hsu et al. |
| 6,083,637 A | 7/2000 | Walz et al. ............... 429/17 |
| 6,096,449 A | 8/2000 | Fuglevand et al. |
| 6,103,410 A | 8/2000 | Fuller et al. |
| 6,120,923 A | 9/2000 | Van Dine et al. |
| 6,165,633 A | 12/2000 | Negishi ............... 429/17 |
| 6,171,574 B1 | 1/2001 | Juda et al. |
| 6,214,484 B1 | 4/2001 | Hauer |
| 6,221,117 B1 | 4/2001 | Edlund et al. ............... 48/76 |
| 6,242,120 B1 | 6/2001 | Herron |
| 6,421,593 B1 | 7/2002 | Kempen et al. |
| 6,451,464 B1 * | 9/2002 | Edlund et al. ............... 429/19 |
| 6,458,477 B1 | 10/2002 | Hsu |
| 6,495,277 B1 * | 12/2002 | Edlund et al. ............... 429/22 |
| 6,522,955 B1 | 2/2003 | Colborn |
| 6,537,690 B1 | 3/2003 | Karrupaiah et al. |

* cited by examiner

US 6,811,908 B2

SYSTEM AND METHOD FOR CONTROLLING THE OPERATION OF A FUEL PROCESSING SYSTEM

RELATED APPLICATION

This application is a continuation patent application claiming priority to U.S. patent application Ser. No. 09/414,049, which was filed on Oct. 6, 1999, issued on May 7, 2002 as U.S. Pat. No. 6,383,670, is entitled "System and Method for Controlling the Operation of a Fuel Processing System," and the complete disclosure of which is hereby incorporated by reference for all purposes.

FIELD OF THE INVENTION

The present invention relates generally to fuel processing systems, and more particularly to a control system that automates the operation of a fuel processing system.

BACKGROUND AND SUMMARY OF THE INVENTION

Fuel processors are used to produce hydrogen gas from a feedstock. In recent years, more and more research is being conducted to develop a commercially practicable fuel processor. For example, one goal is to couple a fuel processor with a fuel cell stack to provide a fuel processing system that may be used as an alternative, or supplement, to conventional energy systems.

An important step to achieving a fuel processor for commercial applications, and especially for smaller scale consumer applications, is a control system that automates at least a substantial portion of the operation of the fuel processing system. In laboratory environments where the fuel processing system is not being used continuously or left unattended for prolonged periods of time, a manually operated system may be acceptable. Should a problem arise, trained technicians will be on hand. However, in commercial applications, such as in households, vehicles and the like where the consumer will generally not be trained in the operation and design of the fuel processing system, the operation of the system must be automated. Even when the fuel processing system is functioning properly, consumers will neither have the technical knowledge, nor the desire, to manually control the operation of the system.

Therefore, there is a need for a control system adapted to automate the operation of a fuel processor, such as a fuel processor forming a portion of a fuel processing system including a fuel cell stack. The present invention provides such a control system and a method for monitoring and/or controlling the operation of a fuel processing system.

Many other features of the present invention will become manifest to those versed in the art upon making reference to the detailed description which follows and the accompanying sheets of drawings in which preferred embodiments incorporating the principles of this invention are disclosed as illustrative examples only.

DETAILED DESCRIPTION AND BEST MODE OF THE INVENTION

Figure 1:
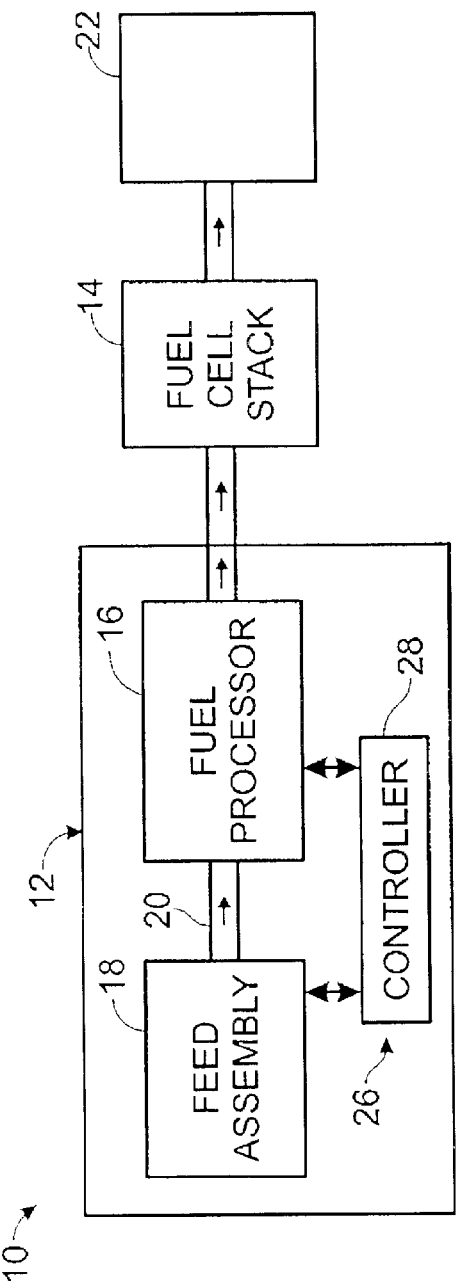
FIG. 1 is a schematic view of a fuel processing system according to the present invention, including a fuel processing assembly and a fuel cell stack.

A fuel processing system is shown in FIG. 1 and generally indicated at 10. As shown, system 10 includes a fuel processing assembly 12 and a fuel cell stack 14. Fuel processing assembly 12 includes a fuel processor 16 that produces hydrogen gas from a feed stream 20, which typically comprises an alcohol or hydrocarbon, and which may include water. Fuel processing assembly 12 further includes a feed assembly 18 that delivers feed stream 20 to fuel processor 16. Examples of suitable feedstocks include alcohols, such as methanol, ethanol, ethylene glycol and propylene glycol, and hydrocarbons, such as methane, propane and transportation fuels, such as gasoline, diesel and jet fuel. It is within the scope of the present invention that any other suitable feedstock may be used, as is known in the art.

Fuel processor 16 converts the feedstock into hydrogen gas, at least a significant portion of which is typically delivered to fuel cell stack 14. Stack 14 uses the hydrogen gas to produce an electric current that may be used to meet the electrical load supplied by an associated electrical device 22, such as a vehicle, boat, generator, household, etc. It should be understood that device 22 is schematically illustrated in the Figures and is meant to represent one or more devices adapted to receive electric current from the fuel processing system responsive to an applied electric load.

Fuel cell stack 14 includes one or more fuel cells adapted to produce an electric current from the hydrogen gas produced by the fuel processor. An example of a suitable fuel cell is a proton exchange membrane (PEM) fuel cell, in which hydrogen gas is catalytically dissociated in the fuel cell's anode chamber into a pair of protons and electrons. The liberated protons are drawn through an electrolytic membrane into the fuel cell's cathode chamber. The electrons cannot pass through the membrane and instead must travel through an external circuit to reach the cathode chamber. The net flow of electrons from the anode to the cathode chambers produces an electric current, which can be used to meet the electrical load being applied by device 22. In the cathode chamber, the protons and electrons react with oxygen to form water and heat. Other types of fuel cells may be used in stack 14, such as alkaline fuel cells.

Also shown in FIG. 1 is a control system 26 with a controller 28 that is adapted to automate the operation of fuel processing assembly 12, and in some embodiments, the entire fuel processing system 10. Unlike conventional fuel processing systems, which are manually operated and require a trained technician to be available should the system malfunction or require adjustment, the performance of system 10 is regulated and automatically adjusted responsive to changes in operating parameters detected by control system 26. As discussed in more detail subsequently, control system 26 includes controller 28, which is preferably software operating on a processor. However, it is within the scope of the present invention that controller 28 may be otherwise implemented, such as with one or more digital and/or analog circuits, or the combination of the two.

Control system 26 further includes a plurality of sensor assemblies in communication with controller 28 and adapted to monitor selected operating parameters of the fuel processing system. Responsive to input signals from the sensor assemblies, user commands from a user-input device, and/or programmed subroutines and command sequences, the controller regulates the operation of the fuel processing system. More specifically, controller 28 communicates with a control-signal receiving portion of the desired region or element of the fuel processing system by sending command signals thereto directing a particular response. For example, controller 28 may send control signals to pumps to control the speed of the pumps, to valve assemblies to control the relative flowrate therethrough, to pressure regulators to control the pressure of the conduit or vessel regulated thereby, etc.

It should be understood that the sensor assemblies, control-signal receiving devices, and communication pathways described herein may be of any suitable construction known in the art. The sensor assemblies may include any suitable sensor for the operating parameter being monitored. For example, flow rates may be monitored with any suitable flow meter, pressures may be monitored with any suitable pressure-sensing or pressure-regulating device, etc. The assemblies may also, but do not necessarily include a transducer in communication with the controller. The communication pathways may be of any suitable form known in the art, including radio frequency, wired electrical signals, wireless signals, optical signals, etc.

In the Figures, communication pathways are schematically illustrated as single- or double-headed arrows. An arrow terminating at controller 28 schematically represents an input signal, such as the value of a measured operating parameter, being communicated to controller 28. An arrow extending from controller 28 schematically represents a control signal sent by controller 28 to direct a responsive action from the device at which the arrow terminates. For example, in FIG. 2, dual-headed pathways 62 schematically illustrate that controller 28 not only sends command signals to corresponding receivers in fuel processor 16 and feed assembly 18 to provide a determined responsive action, but also receives inputs from sensor assemblies contained within the fuel processor and feed assembly.

Figure 2:
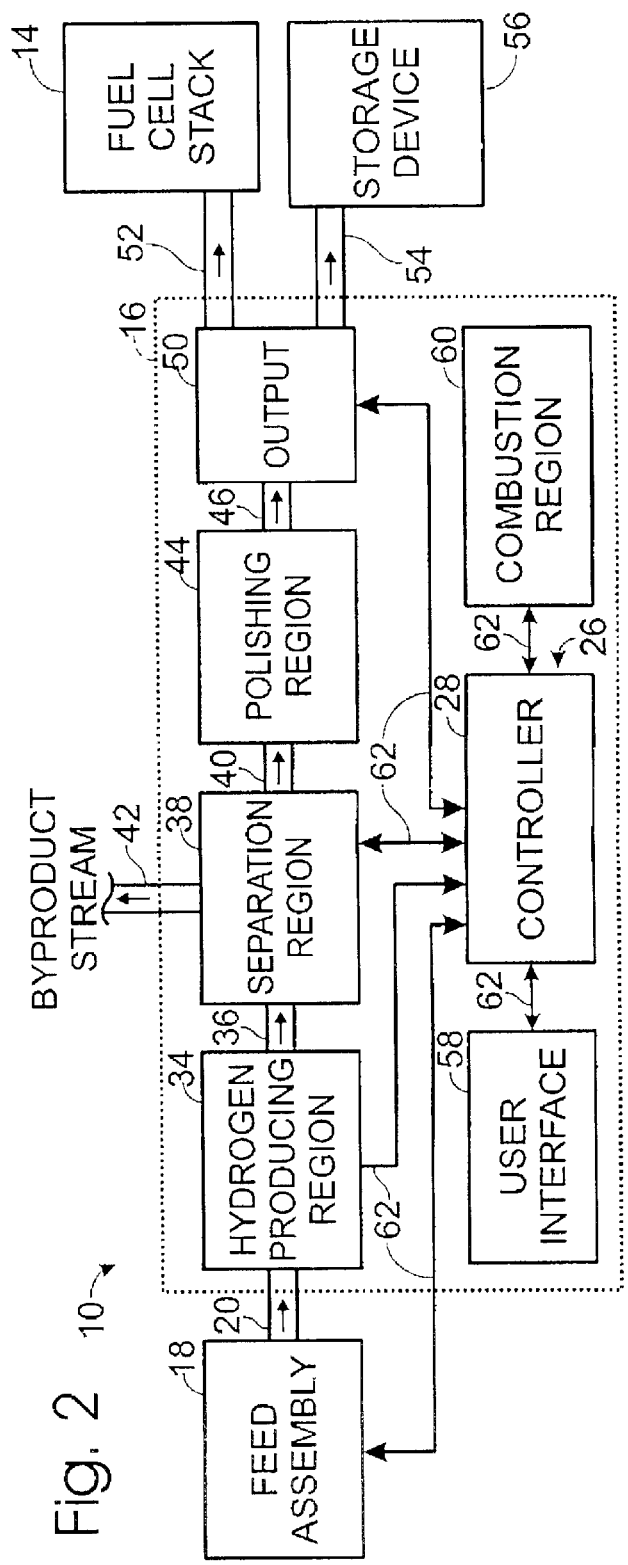
FIG. 2 is a schematic view showing components of the fuel processor of FIG. 1.

In FIG. 2, an embodiment of a fuel processing system 10 according to the present invention is shown in more detail. As discussed, assembly 12 is shown schematically as an example of a suitable fuel processor and feed assembly, and other fuel processors and feed assemblies may be used without departing from the spirit and scope of the present invention. To provide a framework for discussing the interaction of control system 26 with the fuel processing system shown in FIG. 2, the principal regions of fuel processing assembly will be briefly discussed in the following description, followed by a more detailed description of each region with an emphasis on how the elements in the region interact with the control system of the present invention.

As discussed, fuel processing assembly 12 includes a fuel processor 16 and a feed assembly 18. Feed assembly 18 delivers feed stream 20 to a hydrogen-producing region 34 of fuel processor 16. Hydrogen-producing region 34 produces hydrogen gas from feed stream 20 through any suitable mechanism. Suitable mechanisms include steam reforming of an alcohol or hydrocarbon vapor, partial oxidation of a hydrocarbon or alcohol vapor, a combination of partial oxidation and steam reforming a hydrocarbon or an alcohol vapor, pyrolysis of a hydrocarbon or alcohol vapor, or autothermal reforming of an alcohol or hydrocarbon. Examples of suitable steam reformers are disclosed in U.S. Pat. No. 6,376,113, the disclosure of which is hereby incorporated by reference. When hydrogen-producing region 34 operates by steam reforming, feed stream 20 will typically include steam and an alcohol or hydrocarbon vapor. When region 34 operates by pyrolysis or partial oxidation, stream 20 will not include a water component.

From hydrogen-producing region 34, a resultant stream 36 delivers the hydrogen-containing fluid to a separation region 38. When hydrogen-producing region 34 is a stream reforming region, stream 36 may be referred to as a reformate stream. In separation region 38, the stream is divided into a product stream 40 and a byproduct stream 42. Product stream 40 includes at least a substantial portion of hydrogen gas and preferably contains less than determined minimum concentrations of compositions that would damage or interfere with the intended use of the product stream. Ideally, stream 40 is free from such compositions, however, it is sufficient that any potentially interfering or damaging compositions are present in concentrations that are not high enough to impair or interfere with the intended use of stream 40. For example, when the product stream is to be delivered to fuel cell stack 14 (either directly, or after being stored for a selected period of time), the stream should be at least substantially free of carbon monoxide. However, the stream may contain water without damaging fuel cell stack 14 or the production of an electric current therein.

Sometimes, it may be desirable to pass product stream 40 through a polishing region 44 in which the concentration of undesirable compositions is reduced or removed. It should be understood that polishing region 44 is not essential to all embodiments of the invention. For example, separation region 38 may result in product stream 40 being sufficiently free of undesired compositions for the intended use of the product stream.

From polishing region 44, the product stream is delivered to an output assembly 50 from which the stream leaves the fuel processor 16 and is delivered to a suitable destination or storage device. For example, the product hydrogen may be delivered to fuel cell stack 14 via stream 52 to produce an electric current therefrom. Some or all of the produced hydrogen may alternatively be delivered via stream 54 to a storage device 56. Examples of suitable devices include storage tanks, carbon absorbents such as carbon nanotubes, and hydride beds, although any other suitable device for storing hydrogen gas may be used and is within the scope of the present invention.

At least portions of fuel processor 16 typically operate at an elevated temperature. For example, hydrogen-producing region 34 typically operates at an elevated temperature, and separation region 38 may operate at an elevated temperature. When an elevated temperature is desired, fuel processor 16 may further include a combustion region 60 or other suitable region for generating sufficient heat to maintain the fuel processor within selected temperature ranges.

Also shown in FIG. 2 is a user interface 58. User interface 58 enables users to communicate with controller 28, such as by inputting user inputs, and/or by receiving information displayed by the controller.

As shown in FIG. 2, controller 28 communicates, via one- or two-way communication pathways 62, with some or all of the regions of the fuel processing assembly described above. It should be understood that it is not required that controller 28 communicate with each of the regions of the fuel processing assembly shown in FIG. 2, and that controller 28 may also communicate with regions other than those shown in FIG. 2. To illustrate this point, no communication pathways 62 have been shown communicating with polishing region 44. However, it is within the scope of the present invention that system 26 may include one or more pathways communicating with this portion of the fuel processing system.

Turning now to FIGS. 3–10, a more detailed discussion of the components of fuel processing system 10 is provided, including examples of operating parameters that may be monitored by the control system and command signals that may be sent responsive thereto.

Figure 3:
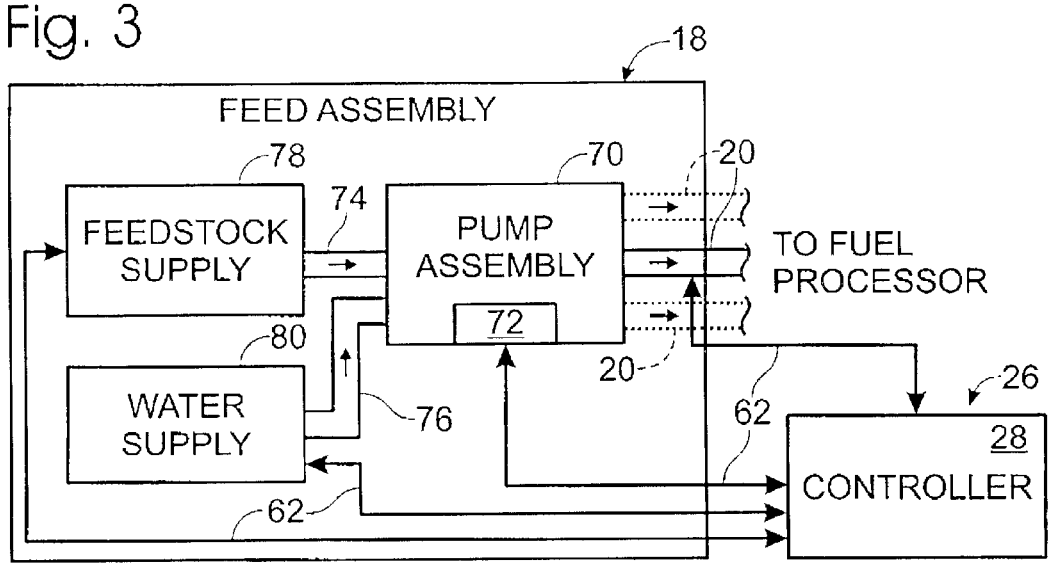
FIG. 3 is a schematic view showing the controller and the feed assembly of FIG. 2.

In FIG. 3, an illustrative embodiment of feed assembly 18 is shown in more detail. As shown, assembly 18 includes a pump assembly 70 that includes one or more pumps 72 adapted to draw flows 74 and 76 from a feedstock supply 78 and a water supply 80. When the feedstock is miscible in water, the feedstock and water may be mixed to form a composite feed stream 20, as shown in solid lines in FIG. 3. It is within the scope of the present invention, however, that the streams may be separately delivered to fuel processor 16, as shown in dashed lines in FIG. 3. It is also within the scope of the present invention that water supply 80 and feedstock supply 78 include fluid connections to sources external feed assembly 18. As discussed previously, some embodiments of system 10 utilize a hydrogen-producing mechanism that does not require water. In these embodiments, feed assembly 18 will not need to include a water supply.

As shown in FIG. 3, controller 28 communicates with stream 20 to monitor and/or regulate the flowrate and pressure in the stream. When the flows are separately drawn from their respective supplies, pump assembly 70 preferably includes flow controls adapted to regulate the relative flow rate of each component of the feed stream responsive to inputs from controller 28. Preferably, controller 28 also receives inputs from pump assembly 70, such as the speed of each pump in pump assembly 70 and the flowrate of fluid in feed stream(s) 20.

Controller 28 may also receive inputs regarding the level of fluid in each supply 78 and 80. If the level drops below a selected level, the controller may direct additional fluid to be added to the supply, such as from an external source (not shown). If no additional fluid is available and the level drops below determined minimum levels, then the controller may take the appropriate programmed response, such as executing the control system's shutdown subroutine and alerting the user of the problem, or fault, via user interface 58. As discussed in more detail subsequently, when the controller determines that an operating parameter of the fuel processing system exceeds a determined threshold value or range of values, it will automatically actuate a shutdown subroutine to prevent damage to the fuel processing system.

By monitoring process parameters such as those discussed above, controller 28 may compare the measured values to expected, or stored, values to determine if the fuel processing system is operating properly. Similarly, the measured values may be used by the controller to determine if other elements of the fuel processing system are within acceptable operating conditions. For example, if the measured flowrate (communicated via pathway 62 and measured, for example, by any suitable flow meter) in stream(s) 20 does not correspond with the expected flowrate, as determined by controller 28 (such as based on programmed data, the measured pump speed, etc.), then the controller may automatically execute its shutdown subroutine or signal the user that the system requires servicing or maintenance of pump assembly 70.

Figure 4:
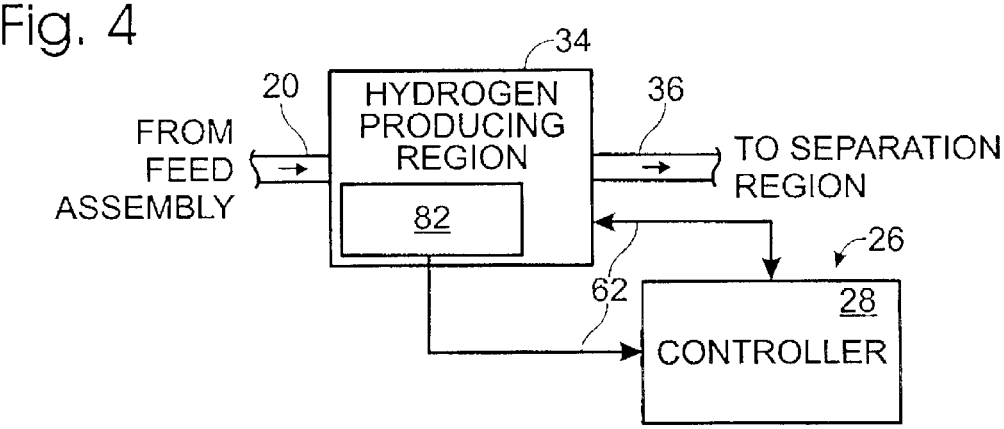
FIG. 4 is a schematic view showing the controller and the hydrogen-producing region of FIG. 2.

In FIG. 4, feed stream 20 is delivered to hydrogen-producing region 34. Region 34 includes suitable catalysts or other structure for the implemented mechanism by which hydrogen gas is to be produced from stream 20. For example, when region 34 produces hydrogen by steam reforming, it will contain one or more reforming catalyst beds 82 in which the feed stream is at least substantially converted into hydrogen gas and carbon dioxide. A byproduct of this reaction is carbon monoxide, which in concentrations of even a few parts per million may permanently damage a PEM fuel cell stack. When the feedstock is methanol, the primary reaction is

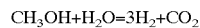

As discussed, the reaction in hydrogen-producing region 34 is typically conducted at elevated temperatures. For example, steam reforming of methanol is preferably conducted at a temperature above approximately 250° C., and steam reforming of most other alcohols and hydrocarbons is preferably conducted at temperatures above approximately 600° C. To ensure that region 34 is maintained above a determined minimum temperature, and more preferably within determined temperature ranges, controller 28 monitors the temperature of region 34. In the context of a steam reformer and other temperature-dependent catalyzed reactions, it is preferable that controller 28 monitors the temperature of the catalyst bed at one or more locations within or adjacent the catalyst bed to ensure that the bed is within determined temperature ranges. Should the temperature be approaching or below a determined threshold value, controller 28 may cause the temperature to be raised, such as by sending additional fuel to combustion region 60. Controller 28 may also monitor the pressure in region 34, via a suitable pressure sensor or pressure regulator, to maintain the pressure in the region within selected limits.

It is within the scope of the present invention that controller 28 may be adapted to direct more than one type of command signal responsive to detected values of an operating variable. For example, controller 28 may be programmed to automatically try to achieve and maintain, via command signals, a determined value of an operating parameter, such as the temperature in hydrogen-producing region 34, the pressure in separation region 38, etc. This level of automation may be referred to as a first level of control, in which the controller maintains a particular operating parameter at or near a desired value. Typically, this value will be bounded by threshold values that establish determined minimum and/or maximum values. Should the measured value of the operating parameter approach or exceed one of the threshold values, controller 28 may send command signals other than those used in the first level of control described above. For example, the controller may execute its shutdown subroutine to transition the fuel processing system to its idle or off operating state.

When the performance of the mechanism utilized in the hydrogen-producing region is temperature dependent, processor 16 will typically include a mechanism for selectively heating the hydrogen-producing device. The reforming catalyst bed described above is an example of such a temperature-dependent mechanism. For example, it is preferable that bed 82 be preheated to at least 250° C. when steam reforming methanol, and at least 600° C. when steam reforming other alcohols and hydrocarbons.

Figure 5:
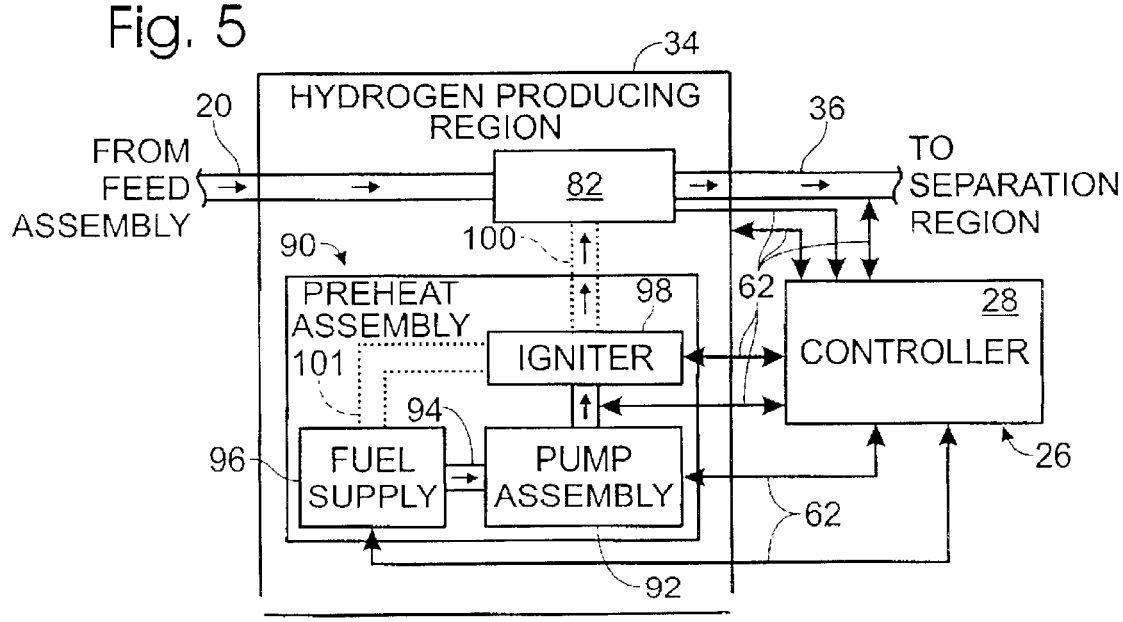
FIG. 5 is a schematic view showing an embodiment of the hydrogen-producing region of FIG. 2 including a preheating assembly.

An example of a suitable mechanism for heating the reforming catalyst, or any other hydrogen-producing device requiring an elevated temperature, is a preheating assembly 90, such as shown in FIG. 5. As shown, assembly 90 includes a pump assembly 92 that draws a fuel stream 94 from a fuel supply 96 and combusts this stream to heat bed 82 or other hydrogen-producing device, as schematically illustrated in dashed lines at 100. Supply 96 may be located external fuel processing assembly 12. When fuel supply 96 is adapted to deliver a compressed gaseous fuel, pump assembly 92 is not required, and the fuel stream may be delivered directly to an igniter 98, such as schematically illustrated at 101. Igniter 98 is shown in FIG. 5 and is meant to include any suitable mechanism for igniting fuel stream 94. This includes a glow plug or resistance element, spark plug, pilot light, or other suitable hot surface, flame or spark to ignite the fuel. Another example of a suitable igniter 98 is a combustion catalyst.

Preheating assembly 90 may utilize any suitable fuel. Examples of suitable fuels include propane, natural gas, and transportation fuels. Another example of a suitable fuel is hydrogen gas, such as hydrogen gas previously produced by fuel processor 16. In fact, controller 28 may direct a portion of the product hydrogen stream to be recycled to preheating assembly 90 through a suitable conduit (not shown) when the temperature in the hydrogen-producing region approaches or falls below a desired minimum temperature. When the byproduct stream contains sufficient hydrogen gas or other combustible material, it too may serve as a fuel source for preheating assembly 90 or combustion region 60.

As shown, controller 28 communicates with fuel supply 96 and pump assembly 92, such as previously described in connection with feedstock supply 78 and pump assembly 70. Controller 28 also communicates with igniter 98. This communication is preferably two-way communication so that controller 28 can not only selectively activate and deactivate the igniter, but also monitor the igniter to detect a lack of ignition, such as within a determined time period after a control signal is sent to activate the igniter, or an unintentional flameout. In either situation, the controller may trigger the shutdown subroutine. Controller 28 may, for example, automatically attempt to reactuate the igniter, and then trigger the shutdown subroutine should the relight attempt fail. Preferably, actuating the shutdown subroutine also causes controller 28 to send a command signal to stop pump assembly 92 and the flow of fuel from supply 96.

Figure 6:
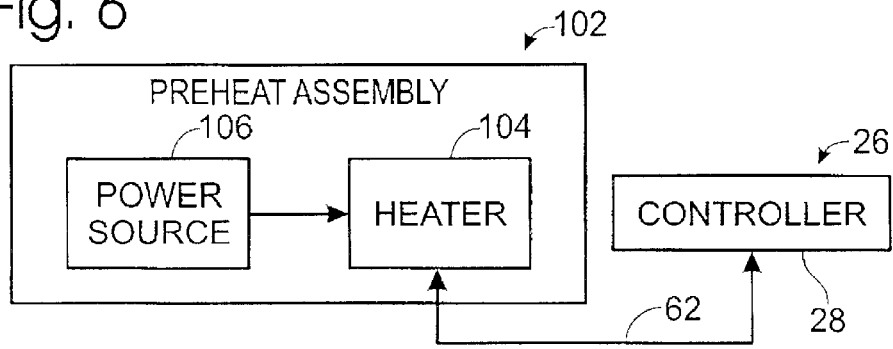
FIG. 6 is a schematic view showing another embodiment of the preheating assembly of FIG. 5.

Another embodiment of a preheating assembly is shown in FIG. 6 and generally indicated at 102. Instead of providing heat to hydrogen-producing region 34 through the use of a combustible fuel, assembly 102 utilizes a heater 104, such as a resistance heater that receives an electric current from a power source 106. Examples of power source 106 include fuel cell stack 14, a battery bank storing current from fuel cell stack 14, an external source of electric current, and a battery bank independent of fuel cell stack 14. Controller 28 sends control signals to heater 104 to selectively activate, deactivate and control the heat output of the heater, responsive to inputs from sensors in region 34 and/or preprogrammed commands stored in controller 28.

Heating, such as in the above preheating assemblies or in the subsequently described combustion region, may also be accomplished through the use of an external heat source. An example of this is through heat exchange with the combustion output from an external combustion source. Another example is through heat exchange with an output stream from a boiler or furnace.

Figure 7:
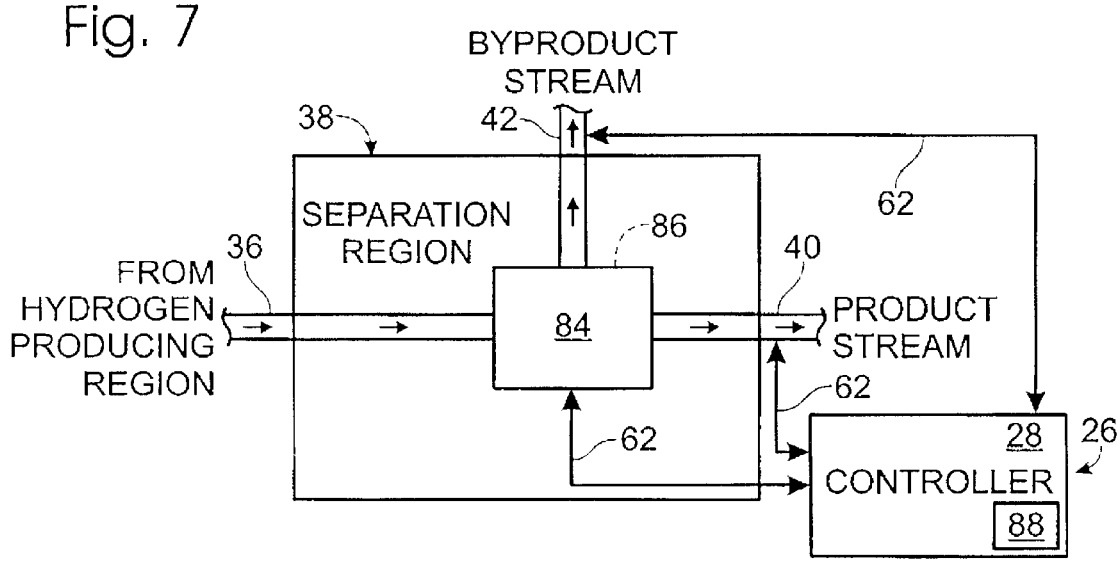
FIG. 7 is a schematic view showing the controller and the separation region of FIG. 2.

Resultant stream 36 from region 34 is passed to separation region 38, as shown in FIG. 7. In region 38, stream 36 is divided into product stream 40 and byproduct stream 42. One suitable method for partitioning stream 36 is through the use of a hydrogen-selective membrane, which preferably isolates at least a substantial portion of the hydrogen gas, while limiting or preventing the inclusion of undesirable compositions. In FIG. 7 a membrane assembly 84 is shown and includes at least one hydrogen-selective membrane 86. Examples of suitable membranes are membranes formed from palladium or palladium alloys. Other suitable hydrogen-separation devices that may be used include absorbent beds, catalytic reactors, and selective oxidation. Examples of suitable absorbent beds include zeolite and carbon beds, and an example of a suitable catalytic reactor includes a water-gas-shift reactor.

As shown, controller 28 communicates with separation region 38 to monitor such process parameters as the temperature and/or pressure within membrane assembly 84 or any other hydrogen-separation device being used therein. Controller 28 may also monitor the temperature and/or pressure of product and byproduct streams 40 and 42. In membrane-based separation systems, the flow of hydrogen gas through the membrane is typically driven by maintaining a pressure differential between the opposed sides of the membrane(s). Therefore, controller 28 may monitor and regulate this pressure responsive to the inputs from sensors on both sides of the membrane. Examples of suitable pressures are a pressure of approximately 30 psig or more on the hydrogen-production side of the membrane and a pressure of approximately 5 psig or less on the product side of the membrane. However, the pressure on the product side of the membrane(s) may be greater than 5 psig if the pressure on the hydrogen-producing side of the membrane(s) is sufficiently elevated. Preferably, the product side of the membrane is maintained as close to ambient pressure as possible, while being maintained above the minimum determined pressure for the fuel cell stack or other end destination for the product stream. These desired threshold values, similar to the other controlled thresholds discussed herein, are stored by controller 28, such as in a memory device 88, and more preferably in a nonvolatile portion of a memory device. Memory device 88 is shown schematically in FIG. 8 only, but it should be understood that device 88 may be included with any embodiment of control system 26 described herein.

Figure 8:
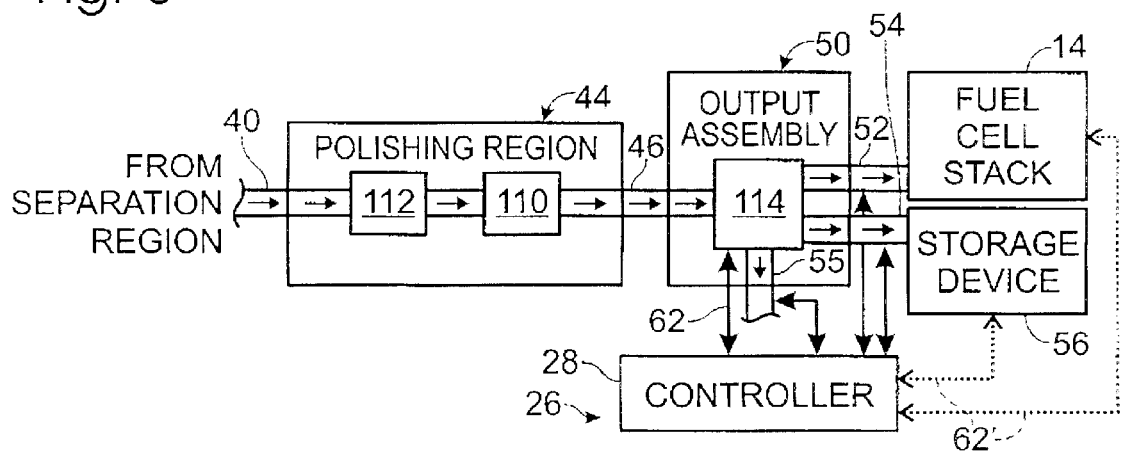
FIG. 8 is a schematic view showing the controller, polishing region and the output assembly of FIG. 2.

In some embodiments of fuel processor 16, product stream 40 may still contain more than an acceptable concentration of some compositions. Therefore, it may be desirable for fuel processor 16 to include a polishing region 44, such as shown in FIG. 8. Polishing region 44 includes any suitable structure for removing or reducing the concentration of selected compositions in stream 40. For example, when the product stream is intended for use in a PEM fuel cell stack or other device that will be damaged if the stream contains more than determined concentrations of carbon monoxide or carbon dioxide, it may be desirable to include at least one methanation catalyst bed 110. Bed 110 converts carbon monoxide and carbon dioxide into methane and water, both of which will not damage a PEM fuel cell stack.

Polishing region 44 may also include another hydrogen-producing device 112, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

The product hydrogen stream, now generally indicated at 46, is next passed to an output assembly 50 and thereafter expelled from the fuel processor. As shown in FIG. 8, output assembly 50 includes a valve assembly 114 including one or more valves that are controlled responsive to command signals from controller 28. It should be understood that valve assembly 114 may include a single valve adapted to distribute the flow between two or more output streams, or it may include a plurality of valves, each directing flow into a different output stream. For example, streams 52 and 54 are shown in FIG. 8 adapted to deliver a selected portion of product stream 46 to fuel cell stack 14 and storage device 56. Each stream may contain anywhere from 0–100% of stream 46, depending upon the control signals sent by controller 28. For example, if there is suitable electrical or thermal load being applied to stack 14 by an associated device, such as device 22, then all of the product stream may be sent to the fuel cell stack. On the other hand, if there is insufficient load being applied to stack 14 to require the entirety of stream 46, then some or all of the stream may be otherwise disposed of, such as being sent to storage device 56. It should be understood that processor 16 may include additional conduits providing additional destinations for product hydrogen stream 46. For example, a selected portion of the stream may be sent to combustion region 60 or preheating assembly 90 to be used as a fuel source, or it may be transported to a hydrogen-consuming device other than stack 14 or device 56.

Output assembly 50 preferably includes a vent stream 55 through which valve assembly 114 may selectively send some or all of the hydrogen stream, responsive to control signals from controller 28. For example, during startup and shutdown sequences of the fuel processor, when the produced hydrogen stream may contain impurities or for other reasons be undesirable as a feed to stack 14, vent stream 55 may be used to dispose of any flow delivered to the output assembly. Stream 55 may exhaust the stream to the atmosphere, deliver the stream to a combustion unit, or dispose of the stream in any other suitable manner. Controller 28 may also direct, via command signs to valve assembly 114, all flow to stream 55 during the idle, or standby, operating states of the fuel processor, where only minimal flow is typically received and when no hydrogen gas is demanded by stack 14.

As shown in FIG. 8, controller 28 not only directs the operation of valve assembly 114, but also receives inputs indicative of such parameters as the pressure, temperature and/or flowrate in streams 52, 54 and 55. These inputs may be used, for example, to ensure that valve assembly 114 is operating properly and to regulate the pressure in stream 52 going to fuel cell stack 14 to ensure that the pressure is not lower than a determined minimum pressure. In systems where it is preferable that the pressure of stream 52 be as low as possible, controller 28 may also selectively control a pressure regulator to reduce the pressure if it is above a determined value.

In FIG. 8, dashed communication pathways 62' are shown to demonstrate schematically that control system 26 may also enable one- or two-way communication between controller 28 and fuel cell stack 14, storage device 56 or any other destination for the product hydrogen streams. For example, responsive to inputs representative of the load being applied to stack 14 from device 22, controller 28 may regulate the rate at which hydrogen is sent to stack 14. Responsive to this input from stack 14, controller 28 may also regulate the rate at which hydrogen gas is produced by processor 16 by controlling the rate at which feedstock is delivered to the fuel processor by the feed assembly. For example, if there is little or no load being applied to stack 14 and system 10 is not adapted to store or otherwise utilize hydrogen gas, then controller 28 may automatically regulate the rate of hydrogen production responsive to the applied load.

Figure 9:
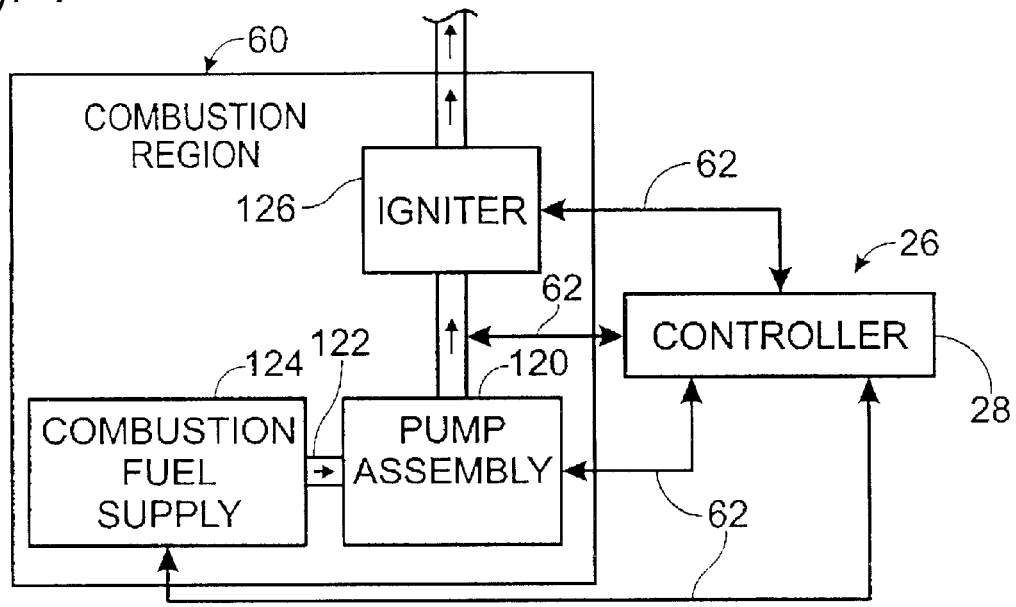
FIG. 9 is a schematic view showing the controller and the combustion region of FIG. 2.

In FIG. 9, an embodiment of combustion region 60 is shown in more detail. As shown, region 60 includes a pump assembly 120 that includes at least one pump adapted to draw a stream 122 of a combustible fuel from a supply 124. Combustion fuel supply 124 may be a compressed gaseous fuel, in which case pump assembly 120 is not required. Similar to the above-described preheating assembly 90, any suitable igniter 126 may be used to ignite the fuel and thereby generate heat to maintain the fuel processor within determined temperature ranges. Responsive to inputs, such as from a temperature sensor in hydrogen-producing region 34, controller 28 regulates the rate at which fuel is drawn from supply 124 to thereby control the temperature of the processor. The examples of igniters and suitable fuels discussed above with respect to preheating assembly 90 are also applicable to combustion region 60, as well as the operating parameters that may be monitored and selectively regulated by control system 26.

Figure 10:
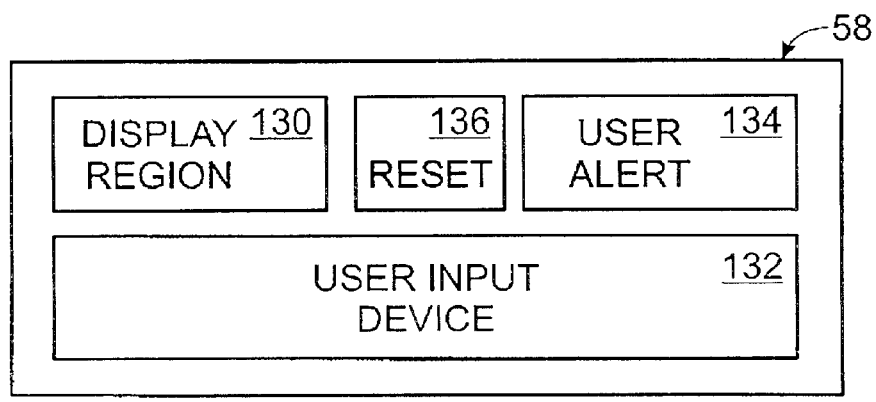
FIG. 10 is a front elevation view of a user interface for a controller for the fuel processor of FIG. 1.

Although the operation of the fuel processing system is preferably at least substantially automated by control system 26, it may still be desirable for the fuel processing system to include a user interface, such as interface 58 shown in FIG. 10. Interface 58 includes a display region 130 through which information is conveyed to the user by controller 28. Typically, the displayed information is indicative of the operating state of the fuel processor, as will be described in more detail subsequently. Also, if the controller detects a malfunction and actuates the shutdown subroutine, display region 130 may include a notification of the fault, including the detected malfunction. The messages or other information displayed to the user are typically stored in the controller's nonvolatile portion of its memory device 88, and are automatically displayed by controller 28 responsive to triggering events detected by the control system. Display region 130 may also include displays of operating parameters detected by the control system, such as selected flowrates, temperatures and pressures, supply levels, etc.

As shown in FIG. 10, interface 58 may also include a user input device 132 through which a user may send commands to the controller. For example, the user may manually input commands to cause controller 28 to startup the fuel processor, shutdown the fuel processor, immediately stop operation of the fuel processor, transition to an idle, or standby, state, etc.

It is within the scope of the present invention that input device 132 may be used to change the determined values utilized by controller 28 to determine whether the current operating state of the fuel processor needs to be adjusted. However, it may be desirable for some or all of the determined values to be protected from being changed by a user, or at least prevented from being changed by an unauthorized user, such as one that does not previously enter a passcode or other authorizing command to the controller.

A user alert device 134 is also shown in FIG. 10 and may be used to signal to a user that a malfunction or fault condition is detected. Device 134 may include any suitable mechanism for attracting a user's attention, such as by emitting visual or audible signals. Also shown in FIG. 10 is a reset 136, which enables a user to cause the controller to restart the fuel processing system, such as after a fault is detected.

As discussed, control system 28 automates the operation of fuel processing assembly 12, and preferably automates the operation of the entire fuel processing system. In the preceding discussion, illustrative components, or regions of fuel processors and fuel processing systems according to the present invention were described. Also discussed were the interaction of control system 26 with these components, including examples of the operating parameters that may be monitored by controller 28, as well as the control signals that controller 28 may use to regulate the operation of the fuel processing system. It should be understood that any desired threshold values may be used. For example, controller 28 may be programmed to utilize the specific operating parameters required for the feedstock, hydrogen-producing mechanism, separation mechanism and product-stream destination implemented in a particular embodiment of the fuel processing system. As a specific example, control system 26 may be programmed to automate fuel processing system 10 according to any or all of the values of operating parameters described in U.S. Pat. No. 6,376,113. Of course, other values may be used as well.

Controller 28 preferably is programmed to automatically switch between and maintain defined operating states according to preprogrammed subroutines responsive to user inputs (such as to startup or shutdown the fuel processing system) and/or inputs from the operating parameters (such as the detection of a malfunction or operating parameter exceeding a defined threshold value for which automated correction is not effective or preprogrammed).

Figure 11:
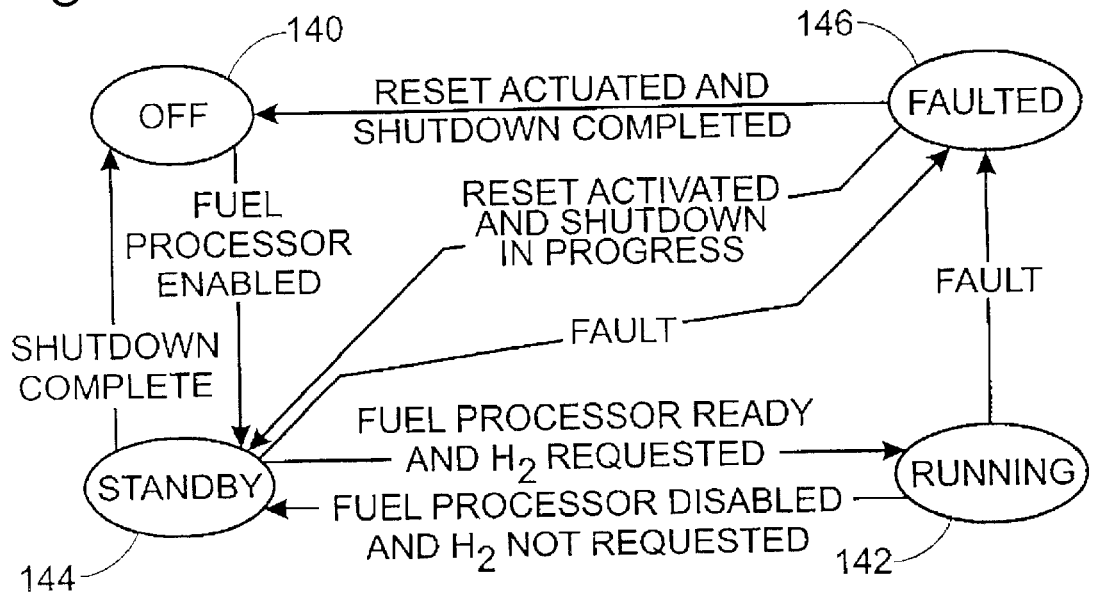
FIG. 11 is a flow chart illustrating the relationships between the automated operating states of the fuel processing system of FIG. 1.
Figure 12:
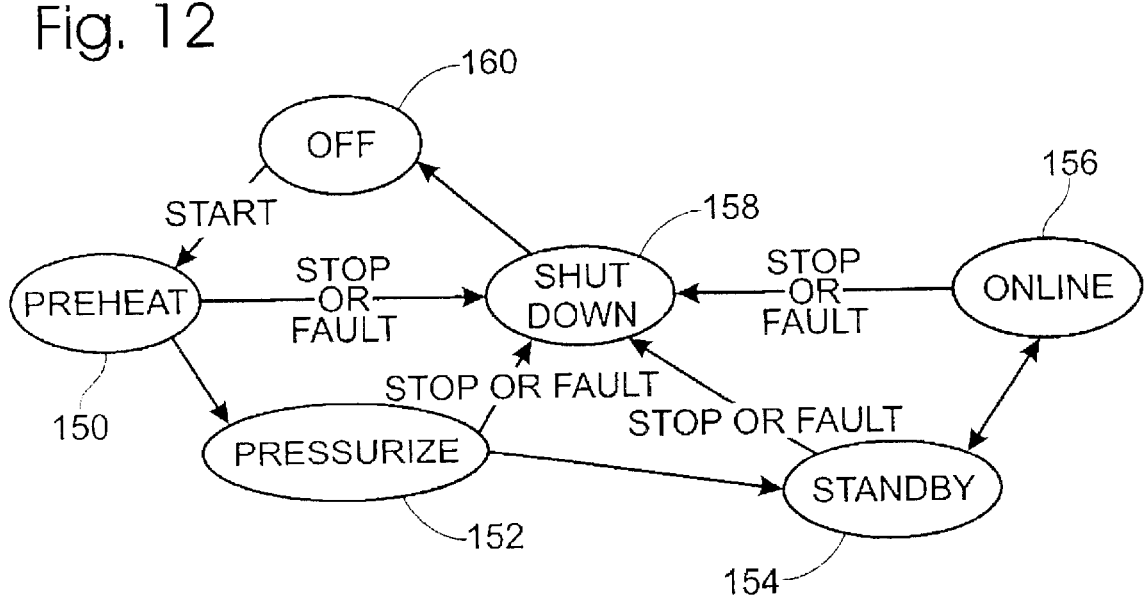
FIG. 12 is a flow chart illustrating the relationships between the subroutines executable by the controller of FIG. 1.

To illustrate how control system 26 may automate the operation of a fuel processing assembly and/or system, the following discussion and FIGS. 11 and 12 are provided. In FIG. 11, examples of possible operating states and the relationships therebetween are schematically illustrated. As the following discussion demonstrates, the operating states may be achieved with only a few command signals from the controller 28 since most of the fuel processing system is a passive system that requires an input stream to trigger a result. For example, once hydrogen-producing region 34 reaches at least a minimum acceptable operating temperature, it automatically produces hydrogen gas when feed stream 20 is delivered thereto. Similarly, separation region 38 and polishing region 44 automatically separate and polish, respectively, any stream delivered thereto, and fuel cell stack 14 automatically produces an electric current when a hydrogen stream is delivered thereto.

In FIG. 11, four illustrative operating states are shown, namely, off stale 140, running state 142, standby state 144, and faulted state 146. Off state 140 corresponds to when there is no feedstock being delivered to fuel processor 16, no heat being generated in combustion region 60 or preheating assembly 90, and the fuel processor is depressurized. The fuel processing system is not operating and has no input or output streams.

Running state 142 corresponds to the state where the fuel processor is receiving a flow of feedstock and producing hydrogen therefrom. The product hydrogen stream is expelled from output assembly 50 and sent to fuel cell stack 14 or another destination. In the running state, combustion region 60 typically will also be used either intermittently or continuously to maintain the temperature with the fuel processor within determined threshold values, and preferably at or near a selected operating value between these threshold values.

Standby state 144 corresponds to when the fuel processor is transitioning between its off and running states. In this state, the controller achieves and maintains determined operating temperatures and pressures within the fuel processor, but typically little, if any, product stream will be delivered to fuel cell stack 14 or storage device 56. Instead, any product stream reaching output assembly 50 will typically be combusted for heat, exhausted as waste gas, or otherwise disposed of. Standby state 144 may also be thought of as an idle state because the fuel processing system is primed to produce hydrogen and/or electric current, but none is required or being generated in more than a nominal amount, such as would be required to operate the fuel processing system.

From off state 140, controller 28 automatically directs the fuel processor to achieve its standby operating state responsive to an input signal, such as a user input from interface 58, a load being applied to fuel cell stack 14, a timed input signal from controller 28 itself, etc. If standby state 144 is successfully achieved, controller 28 may either be programmed to direct system 10 to attain its running state, namely, by starting the flow of feedstock to fuel processor 16, or to await the input of a signal to trigger the transition to running state 142.

In either running state 142 or standby state 144, the detection of a malfunction will cause controller 28 to automatically transition to faulted state 146. Faulted state 146 corresponds to when the controller detects a malfunction, such as an operating parameter exceeding a determined threshold value. When this occurs, the controller preferably actuates user alert 134 to notify the user that there is a problem detected in the fuel processing system. Controller 28 also stops the flows of fuel and feedstock within the system, such as by directing the pump assemblies to stop drawing from their corresponding supplies. Similarly, controller 28 may direct any product stream within the fuel processor to be utilized through stream 55, thereby preventing any potentially contaminated stream from reaching fuel cell stack 14 or storage device 56. The igniters may also be deactivated.

From faulted state 146, the controller will either direct the transition to off state 140, such as if no reset signal is received, or will attempt to transition back to standby state 144. If an input directing the controller to shutdown the fuel processing system is received while in the running state, controller 28 will preferably transition first to the standby state to safely stop the production of hydrogen, and then to the off state.

It should be understood that controller 28 may be programmed to include other operating states than those shown in FIG. 11. For example, there may be more than one running state, such as to correspond to different rates of hydrogen production. Similarly, there may be separate startup and standby operating states.

Controller 28 transitions between the operating states by executing various programmed subroutines, each of which directs the controller to automatically send input signals required to achieve a selected result. Illustrative examples of suitable subroutines are shown in FIG. 12 and include preheat 150, pressurize 152, standby 154, online 156 and shutdown 158 and off 160.

In preheat subroutine 150, controller 28 sends command signals required to begin heating the fuel processor to its desired operating temperature range. Typically, this subroutine includes directing combustion region 60 to begin heating the fuel processor. It may also include directing preheating assembly 90 or 102 to begin heating hydrogen-producing region 34 to at least a minimum temperature required to effectively produce a product stream with an acceptable composition. Both of these heat-producing units will typically continue to be used during the subsequent pressurize subroutine 152, then the preheating assembly will generally be deactivated (by turning off the igniter and/or stopping the flow of fuel, or by deactivating the heater). The combustion region will typically continue to operate during all but the shutdown and off subroutines, although the relative rate of operation may be regulated by controller 28, such as by controlling the rate at which fuel is delivered to the igniter.

Once the hydrogen-producing region has achieved a selected threshold temperature, which is monitored and detected by a sensor assembly in communication with controller 28, controller 28 executes pressurize subroutine 152. In pressurize subroutine 152, feed stream 20 is introduced into the fuel processor (by controller 28 actuating pump assembly 70) to begin the production of hydrogen and thereby pressurize the fuel processor. Once the fuel processor reaches a selected operating pressure, the controller executes standby subroutine 154. When standby subroutine 154 is executed, controller 28 deactivates the preheating assembly, and the controller regulates the flow of feed stream 20 to produce a sufficient flow in product stream 52 and/or byproduct stream 42 to provide fuel for combustion region 60.

When there is a demand for hydrogen product stream, such as when a load is applied to fuel cell stack 14, the online subroutine is executed. In this subroutine, the controller increases the flow rate of feed stream 20, thereby increasing the rate at which hydrogen is produced, and as a result current is produced in stack 14. Valve assembly 114 is also actuated by a suitable command signal to direct hydrogen to fuel cell stack 14. Assembly 114 may optionally be actuated in the pressurize subroutine to send a hydrogen stream to stack 14 so that stack 14 may produce current to power the operation of system 10.

Should a malfunction be detected by controller 28, controller 28 will automatically execute its shutdown, or fault, subroutine. The shutdown subroutine may also be executed responsive to a user input signal or programmed signal directing shutdown of the fuel processing system. In this subroutine, the controller stops the flow of feed stream 20, as well as the flow of fuel to combustion region 60 and preheating assembly 90.

If a command, such as the user actuating reset 136, is not received, controller 28 will next execute its off subroutine. In this subroutine, the controller deactivates any activated heater or igniter and begins depressurizing the fuel processor. Finally, when the fuel processing system is safely depressurized and all flows have stopped, the valves in assembly 114 are closed and the shutdown of the fuel processing system is complete.

It should be understood that the above operating states and subroutines have been presented to provide an example of how the invented control system automates the operation of fuel processing system 10. The examples provided above should not be construed in a limiting sense, as many variations of the subroutines, operating states and commands executed therein are possible and are within the scope of the present invention. For example, when fuel processing system 10 includes a storage device 56 adapted to store a supply of hydrogen gas, this stored supply may be sent to fuel cell stack 14 in the preheat subroutine to produce current to power the operation of the fuel processing system.

The automation of fuel processing system 10 enables it to be used in households, vehicles and other commercial applications where the system is used by individuals that are not trained in the operation of fuel processing systems. It also enables use in environments where technicians, or even other individuals, are not normally present, such as in microwave relay stations, unmanned transmitters or monitoring equipment, etc. Control system 26 also enables the fuel processing system to be implemented in commercial devices where it is impracticable for an individual to be constantly monitoring the operation of the system. For example, implementation of fuel processing systems in vehicles and boats requires that the user does not have to continuously monitor and be ready to adjust the operation of the fuel processing system. Instead, the user is able to rely upon the control system to regulate the operation of the fuel processing system, with the user only requiring notification if the system encounters operating parameters and/or conditions outside of the control system's range of automated responses.

It should be understood that the above examples are meant to illustrate possible applications of such an automated fuel processing system, without precluding other applications or requiring that a fuel processing system according to the present invention necessarily be adapted to be used in all of the exemplary scenarios. Furthermore, in the preceding paragraphs, control system 26 has been described controlling various portions of the fuel processing assembly. It is within the scope of the present invention that the system may be implemented without including every aspect of the control system described above. Similarly, system 26 may be adapted (i.e. programmed) to monitor operating parameters not discussed herein and may send command signals other than those provided in the preceding examples.

While the invention has been disclosed in its preferred form, the specific embodiments thereof as disclosed and illustrated herein are not to be considered in a limiting sense as numerous variations are possible. Applicants regard the subject matter of the invention to include all novel and non-obvious combinations and subcombinations of the various elements, features, functions and/or properties disclosed herein. No single feature, function, element or property of the disclosed embodiments is essential to all embodiments. The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

We claim:

1. A fuel processing system, comprising:
 a feed assembly adapted to deliver water and a carbon-containing feedstock to a fuel processor;
 a fuel processor adapted to receive a feed stream containing the carbon-containing feedstock and water, wherein the fuel processor comprises:
  a reforming region, in which a reformate stream containing hydrogen gas and other gases is produced by reforming the feed stream; and
  a separation region that includes at least one hydrogen-selective membrane and in which a product hydrogen stream is formed from a portion of the reformate stream that passes through the at least one hydrogen-selective membrane;

a fuel cell stack that is adapted to receive an oxygen-containing stream and at least a portion of the product hydrogen stream and to produce an electric current therefrom: and a control system that is adapted to regulate and control the operation of the fuel processing system responsive at least in part to inputs from a sensor assembly that includes at least one sensor adapted to measure an operating parameter of the fuel processing system, wherein the control system is adapted to automatically transition the fuel processing system between selected ones of a plurality of operating states responsive at least in part to inputs from the sensor assembly, and further wherein the plurality of operating states includes a running state in which the product hydrogen stream is produced by the fuel processor and at least a portion of the product hydrogen stream is delivered to the fuel cell stack, and an idle state in which the fuel processor is maintained at an operating temperature and an operating pressure for reforming the feed stream, but no more of the product hydrogen stream is delivered to the fuel cell stack than is required to operate the fuel processing system in the idle state.

2. The fuel processing system of claim 1, wherein the control system is adapted to automatically transition the fuel processing system from the running state to the idle state responsive at least in part to an input from the sensor assembly corresponding to an operating parameter measured upstream from the product hydrogen stream.

3. The fuel processing system of claim 2, wherein the input corresponds to an operating parameter measured in the separation region.

4. The fuel processing system of claim 3, wherein the input corresponds to an operating parameter measured upstream from the separation region.

5. The fuel processing system of claim 4, wherein the input corresponds to an operating parameter measured in the reforming region.

6. The fuel processing system of claim 5, wherein the input corresponds to an operating parameter measured upstream from the reforming region.

7. The fuel processing system of claim 6, wherein the input corresponds to an operating parameter measured in the feed assembly.

8. The fuel processing system of claim 1, wherein the control system is adapted to automatically transition the fuel processing system from the running state to the idle state responsive at least in part to a plurality of inputs from the sensor assembly, and further wherein at least one of inputs corresponds to an operating parameter measured upstream from the product hydrogen stream.

9. The fuel processing system of claim 8, wherein the plurality of inputs include at least one input that corresponds to an operating parameter measured in the fuel processor and at least one input that corresponds to an operating parameter measured upstream from the reforming region.

10. The fuel processing system of claim 1, wherein the sensor assembly is adapted to measure the value of at least three operating parameters of the fuel processing system.

11. The fuel processing system of claim 1, wherein the sensor assembly includes a plurality of sensors that are collectively adapted to measure a plurality of operating parameters of the fuel processing system, and further wherein the control system includes a memory device in which threshold values corresponding to the plurality of operating parameters measured by the sensor assembly are stored, and further wherein the control system includes a controller that is adapted to compare the inputs to the corresponding threshold values.

12. The fuel processing system of claim 1, wherein the control system is in communication with a user input device through which user inputs may be received and transmitted to the control system, and further wherein the control system is further adapted to regulate the operation of the fuel processing system responsive at least in part to the user inputs.

13. The fuel processing system of claim 12, wherein the control system is adapted to receive a user input directing a transition between the plurality of operating states, and further wherein the control system is adapted to automatically transition the fuel processing system between selected ones of the plurality of operating states responsive to receipt by the control system of the user input directing a transition between the plurality of operating states.

14. The fuel processing system of claim 1, wherein in the idle state, none of the product hydrogen stream is delivered to the fuel cell stack.

15. The fuel processing system of claim 1, wherein the fuel processing system further includes a storage device adapted to receive and store at least a portion of the product hydrogen stream.

16. The fuel processing system of claim 1, wherein in the idle state, the fuel processor is adapted to deliver at least a substantial portion of the product hydrogen stream to a heating assembly that is adapted to combusts the portion of the product hydrogen stream to produce heat.

17. The fuel processing system of claim 15, wherein in the idle state, the fuel processor is adapted to deliver at least a portion of the product hydrogen stream to the storage device.

18. The fuel processing system of claim 15, wherein in the idle state, the fuel processor is adapted to not deliver any of the product hydrogen stream to the storage device.

19. The fuel processing system of claim 1, wherein the control system further includes a user interface adapted to display information indicative of the performance of the fuel processing system.

20. A fuel processing system, comprising:

a feed assembly adapted to deliver water and a carbon-containing feedstock to a fuel processor;

a fuel processor adapted to receive a feed stream containing the carbon-containing feedstock and water, wherein the fuel processor comprises:

a reforming region, in which a reformate stream containing hydrogen gas and other gases is produced by reforming the feed stream; and a separation region that includes at least one hydrogen-selective membrane and in which a product hydrogen stream is formed from a portion of the reformate stream that passes through the at least one hydrogen-selective membrane;

a fuel cell stack that is adapted to receive an oxygen-containing stream and at least a portion of the product hydrogen stream and to produce an electric current therefrom: and a control system that is adapted to regulate and control the operation of the fuel processing system responsive at least in part to inputs from a sensor assembly that includes at least one sensor adapted to measure an operating parameter of the fuel processing system and responsive to which an input is generated, wherein the control system includes a memory portion containing at least one threshold value that corresponds to a predetermined threshold operating parameter for each of the operating parameters, wherein the control system is adapted to compare the input to the at least one threshold value to determine if the fuel processing system is operating at an operating parameter that exceeds the predetermined threshold operating parameter, and further wherein upon determination that the input exceeds one or more of the at least one threshold value, the control system is adapted to automatically transition the fuel processing system from a running state, in which the product hydrogen stream is produced by the fuel processor and at least a portion of the product hydrogen stream is delivered to the fuel cell stack, to a faulted state in which no feed stream is delivered to the fuel processor and the product hydrogen stream is not delivered to the fuel cell stack, and further wherein from the faulted state the control system is adapted to transition the fuel processing system to either an off state or a standby state, in which the fuel processor is maintained at an operating temperature and an operating pressure for reforming the feed stream, but no more of the product hydrogen stream is delivered to the fuel cell stack than is required to operate the fuel processing system in the standby state.

21. The fuel processing system of claim 20, wherein the control system is adapted to automatically transition the fuel processing system to the faulted state responsive at least in part to an input from the sensor assembly corresponding to an operating parameter measured upstream from the product hydrogen stream.

22. The fuel processing system of claim 21, wherein the input corresponds to an operating parameter measured in the separation region.

23. The fuel processing system of claim 22, wherein the input corresponds to an operating parameter measured upstream from the separation region.

24. The fuel processing system of claim 23, wherein the input corresponds to an operating parameter measured in the reforming region.

25. The fuel processing system of claim 24, wherein the input corresponds to an operating parameter measured upstream from the reforming region.

26. The fuel processing system of claim 25, wherein the input corresponds to an operating parameter measured in the feed assembly.

27. The fuel processing system of claim 20, wherein the control system is adapted to automatically transition the fuel processing system to the faulted state responsive at least in part to a plurality of inputs from the sensor assembly, and further wherein at least one of inputs corresponds to an operating parameter measured upstream from the product hydrogen stream.

28. The fuel processing system of claim 27, wherein the plurality of inputs include at least one input that corresponds to an operating parameter measured in the fuel processor and at least one input that corresponds to an operating parameter measured upstream from the reforming region.

29. The fuel processing system of claim 27, wherein the plurality of inputs includes at least one input that corresponds to an operating parameter measured downstream from the fuel processor.

30. The fuel processing system of claim 20, wherein the sensor assembly is adapted to measure the value of at least three operating parameters of the fuel processing system.

31. The fuel processing system of claim 20, wherein the control system includes a user alert device, and further wherein the control system is adapted to actuate the user alert device when the fuel processing system is transitioned to the faulted state.

32. The fuel processing system of claim 20, wherein the control system is a computer-implemented control system.

33. The fuel processing system of claim 20, wherein the control system is adapted to control the operation of the fuel processing system to maintain the fuel processor within a predetermined range of the operating temperature and the operating pressure for reforming the feed stream.

34. The fuel processing system of claim 20, wherein the sensor assembly is adapted to monitor the value of at least three operating parameters of the fuel processor.

35. The fuel processing system of claim 20, wherein the fuel processing system further includes a storage device adapted to receive and store at least a portion of the product hydrogen stream.

36. The fuel processing system of claim 20, wherein the fuel processor further includes a polishing region that is adapted to receive the product hydrogen stream and to reduce the concentration of one or more selected compositions of the product hydrogen stream.

37. The fuel processing system of claim 36, wherein the one or more selected compositions includes carbon monoxide.

38. The fuel processing system of claim 20, wherein the control system further includes a user interface adapted to display information indicative of the performance of the fuel processing system.

39. The fuel processing system of claim 20, wherein in the standby state, none of the product hydrogen stream is delivered to the fuel cell stack.

40. The fuel processing system of claim 20, wherein in the standby state, the fuel processor is adapted to deliver at least a substantial portion of the product hydrogen stream to a heating assembly that is adapted to combusts the portion of the product hydrogen stream to produce heat.

41. The fuel processing system of claim 35, wherein in the standby state, the fuel processor is adapted to deliver at least a portion of the product hydrogen stream to the storage device.

42. The fuel processing system of claim 35, wherein in the standby state, the fuel processor is adapted to not deliver any of the product hydrogen stream to the storage device.

* * * * *

UNITED STATES PATENT AND TRADEMARK OFFICE
CERTIFICATE OF CORRECTION

| | | |
|---|---|---|
| PATENT NO. | : 6,811,908 B2 | Page 1 of 1 |
| DATED | : November 2, 2004 | |
| INVENTOR(S) | : David J. Edlund, Thomas G. Herron and William A. Pledger | |

It is certified that error appears in the above-identified patent and that said Letters Patent is hereby corrected as shown below:

<u>Column 16,</u>
Line 31, after "heating assembly that is adapted to" please delete "combusts" and insert -- combust -- therefor.

Signed and Sealed this

Fifteenth Day of February, 2005

JON W. DUDAS
*Director of the United States Patent and Trademark Office*